(12) United States Patent
Wendel et al.

(10) Patent No.: US 11,365,070 B2
(45) Date of Patent: Jun. 21, 2022

(54) STORAGE RACK FOR GLASS ARTICLES

(71) Applicant: GUARDIAN GLASS, LLC, Auburn Hills, MI (US)

(72) Inventors: Christopher K. Wendel, Auburn Hills, MI (US); Tim Sutherland, Auburn Hills, MI (US); David Shaw, Auburn Hills, MI (US)

(73) Assignee: GUARDIAN GLASS, LLC, Auburn Hills, MI (US)

(*) Notice: Subject to any disclaimer, the term of this patent is extended or adjusted under 35 U.S.C. 154(b) by 0 days.

(21) Appl. No.: 16/799,658

(22) Filed: Feb. 24, 2020

(65) Prior Publication Data

US 2020/0270073 A1 Aug. 27, 2020

Related U.S. Application Data

(60) Provisional application No. 62/810,277, filed on Feb. 25, 2019.

(51) Int. Cl.
*B65G 49/06* (2006.01)
*B65D 85/48* (2006.01)
*B65D 21/02* (2006.01)

(52) U.S. Cl.
CPC .......... *B65G 49/062* (2013.01); *B65D 21/02* (2013.01); *B65D 85/48* (2013.01); *B65D 21/0209* (2013.01); *B65D 21/0224* (2013.01)

(58) Field of Classification Search
CPC . A47B 87/02; A47B 87/0207; A47B 87/0215; A47B 87/0276; B65G 49/062; B65G 49/05; B65G 49/06; B65G 49/061; B65G 49/063; B65G 49/064; B65G 49/067; B65G 49/068; B65G 49/069; B65D 85/48; B65D 21/00; B65D 21/02; B65D 21/0233; B65D 19/44; B65D 21/048; B65D 21/0235; B65D 19/385; B65D 21/0209;
(Continued)

(56) References Cited

U.S. PATENT DOCUMENTS 3,193,093 A * 7/1965 Hansen ................ B65G 49/062
206/451
6,102,206 A * 8/2000 Pride ..................... B65D 85/48
206/454
(Continued)

FOREIGN PATENT DOCUMENTS

EP 2266884 A1 * 12/2010 ............ B65D 19/16

*Primary Examiner* — Devin K Barnett (57) ABSTRACT

A storage rack is provided for storing glass sheets. The rack includes substantially horizontal and vertical portions. The substantially horizontal and/or vertical portion(s) of the rack include(s) one or more flexible supports, each including at least one channel. Arms are attached to the left and right sides of the rack. The rear legs have tabs attached thereto, with lower lips extending away from the rack. The rack is stackable with another rack, e.g., with the upper rack's rear sitting on the lower rack's arms, and with the upper rack's front supported by a support member extending upwardly from tubing provided in the lower rack that is accommodated in holes/recesses of the upper rack. The arms are sized, shaped, and arranged to reduce the likelihood of tipping of the upper rack, and the tabs help mitigate the effect of side-to-side movement of the upper rack relative to the lower rack.

12 Claims, 10 Drawing Sheets

(58) Field of Classification Search
CPC ............ B65D 21/0215; B65D 21/0224; B65D 21/0226; B65D 2519/00935; B65D 2519/0096; B65D 2519/0097; B65D 2519/00955
USPC .............................................. 211/41.14, 41.1
See application file for complete search history.

(56) References Cited

U.S. PATENT DOCUMENTS

| | | | |
|---|---|---|---|
| 6,279,763 B1* | 8/2001 | Bush ...................... | A47B 43/00 108/55.1 |
| 7,648,035 B2 | 1/2010 | Edwards et al. | |
| 9,340,373 B2* | 5/2016 | McHugh ............... | B65G 49/062 |
| 2004/0245195 A1* | 12/2004 | Pride .................... | B65D 25/101 211/41.14 |
| 2006/0213846 A1* | 9/2006 | Edwards .............. | B65G 49/062 211/41.14 |
| 2018/0186561 A1 | 7/2018 | Fuller et al. | |

* cited by examiner

Fig. 12

STORAGE RACK FOR GLASS ARTICLES

Certain example embodiments relate to a storage rack for storing one or more glass articles, e.g., for storing glass sheets in a substantially parallel spaced-apart manner relative to each other.

BACKGROUND AND SUMMARY

Storage systems for articles such as glass sheets are known in the art. For instance, harp racks are known and have a plurality of cords which serve to separate glass sheets in the rack. However, in the case of harp racks, the cords tend to contact the glass articles (e.g., coated glass sheets) and may cause damage to the coating in certain situations. For instance, the coating can be damaged and rubbed off in certain locations where the cords contact the coating.

U.S. Pat. No. 6,102,206 discloses another type of glass storage rack. However, the rack of the '206 patent is disadvantageous in that it lacks in terms of efficient retention of glass sheets.

It will be apparent to those skilled in the art that there exists a need in the art for an improved system and apparatus for storing glass articles such as coated glass sheets, uncoated glass sheets, glass-inclusive laminated products, insulating glass (IG) units, vacuum insulating glass (VIG) units, and/or the like.

In certain example embodiments of this invention, a storage rack is provided for storing glass articles such as coated glass sheets (e.g., glass sheets with a low-emissivity and/or other type of coating thereon), uncoated glass sheets, glass-inclusive laminated products, insulating glass (IG) units, vacuum insulating glass (VIG) units, and/or the like. The storage rack may be used in a given location for simply storing glass articles in one or multiple locations, or alternatively may be used in transporting glass articles.

A storage rack is provided for storing glass articles. The rack includes substantially horizontal and vertical portions. The substantially horizontal and/or vertical portion(s) of the rack include(s) one or more flexible supports, each including at least one channel. Arms are attached to the left and right sides of the rack. The rear legs have tabs attached thereto, with lower lips extending away from the rack. The rack is stackable with another rack, e.g., with the upper rack's rear sitting on the lower rack's arms, and with the upper rack's front supported by a support member extending upwardly from tubing provided in the lower rack that is accommodated in holes/recesses of the upper rack. The arms are sized, shaped, and arranged to reduce the likelihood of tipping of the upper rack, and the tabs help mitigate the effect of side-to-side movement of the upper rack relative to the lower rack.

BRIEF DESCRIPTION OF THE DRAWINGS

FIG. 2(*a*) is a cross sectional view of the flexible support of FIG. 1, along either Section a-a' or b-b' shown in FIG. 1, when no glass sheet is located in the channel of the flexible support.

FIG. 2(*b*) is a cross sectional view of the flexible support of FIG. 1, along either Section a-a' or b-b' shown in FIG. 1, when a glass sheet is located in the channel of the flexible support.

FIG. 7(*a*) is an enlarged perspective view of a rear left portion at the bottom of the FIG. 6 example glass rack.

FIG. 7(*b*) is an enlarged perspective view of a top left portion thereof.

FIG. 7(*c*) is an enlarged perspective view of a top right portion thereof.

FIG. 7(*d*) is an enlarged perspective view of a front left portion at the bottom of the FIG. 6 example glass rack.

DETAILED DESCRIPTION

In certain example embodiments of this invention, a storage rack is provided for storing glass articles such as coated glass sheets (e.g., glass sheets with a low-emissivity and/or other type of coating thereon), uncoated glass sheets, glass-inclusive laminated products, insulating glass (IG) units, vacuum insulating glass (VIG) units, and/or the like. The storage rack may be used in a given location for simply storing glass articles in one or multiple locations, or alternatively may be used in transporting glass articles. In certain example embodiments, a plurality of glass articles may be aligned substantially parallel to one another in the storage rack. For example, and without limitation, coated or uncoated glass coming out of a tempering furnace may be positioned in the rack. The rack is designed so as to be able to accommodate glass articles of many different sizes without adjustment including, for example, oversized glass articles.

Figure 2A:
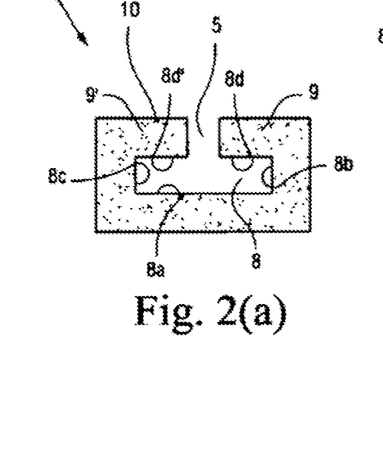
Figure 2B:
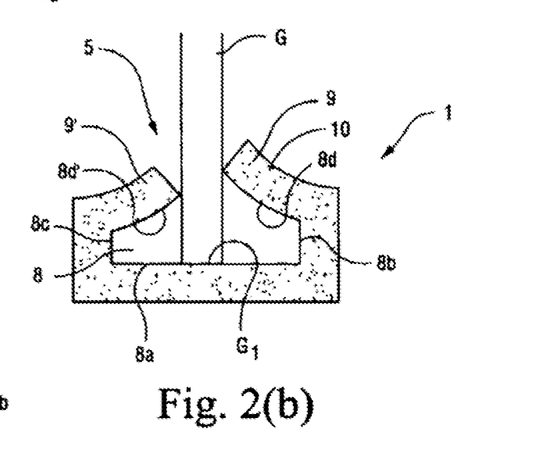
Figure 4:
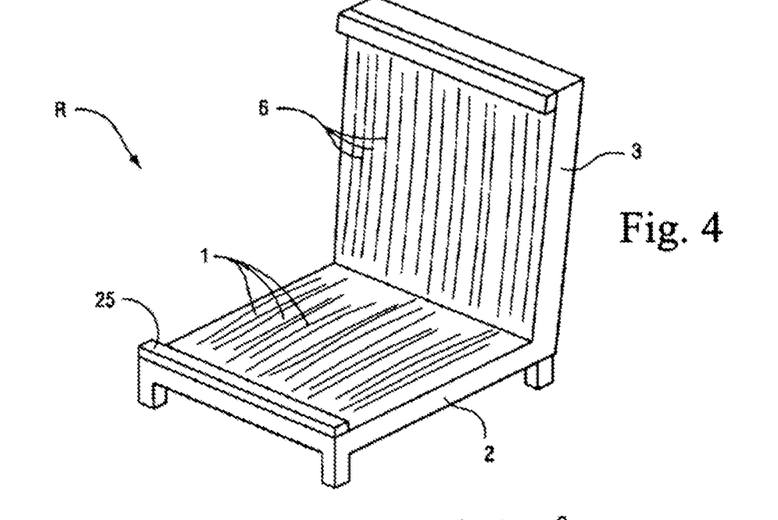
FIG. 4 is a perspective view of a storage rack, the rack including a plurality of parallel-aligned flexible supports of FIGS. 1-3 in the substantially horizontal portion of the rack (no glass sheets are shown in FIG. 4, for purposes of simplicity and understanding).

Referring now more particularly to the figures in which like reference numerals indicate like parts throughout the several views, FIG. 4 is a perspective view of a storage rack R. Rack R includes substantially horizontal portion 2 adapted to be located on the floor/ground, and a substantially vertical portion 3 which may be oriented in an upright position relative to the floor/ground. A plurality of parallel-aligned flexible supports 1 are provided as part of the substantially horizontal portion 2 of the rack. It is noted that no glass sheets are shown in FIG. 4, for purposes of simplicity and understanding. In certain example instances, when a plurality of parallel supports 1 are aligned in an abutting manner in portion 2 of the rack, the color of the supports 1 may alternate (e.g., black/white/black/white/ black/etc.) across the width of the portion 2 of the rack, thereby enabling an operator to more easily align and fit a glass sheet G in the channel 5 in the horizontal portion 2, which corresponds to the channel 6 in the vertical portion 3 of the rack (e.g., as can be appreciated with reference to FIG. 2(*b*).

Figure 1:
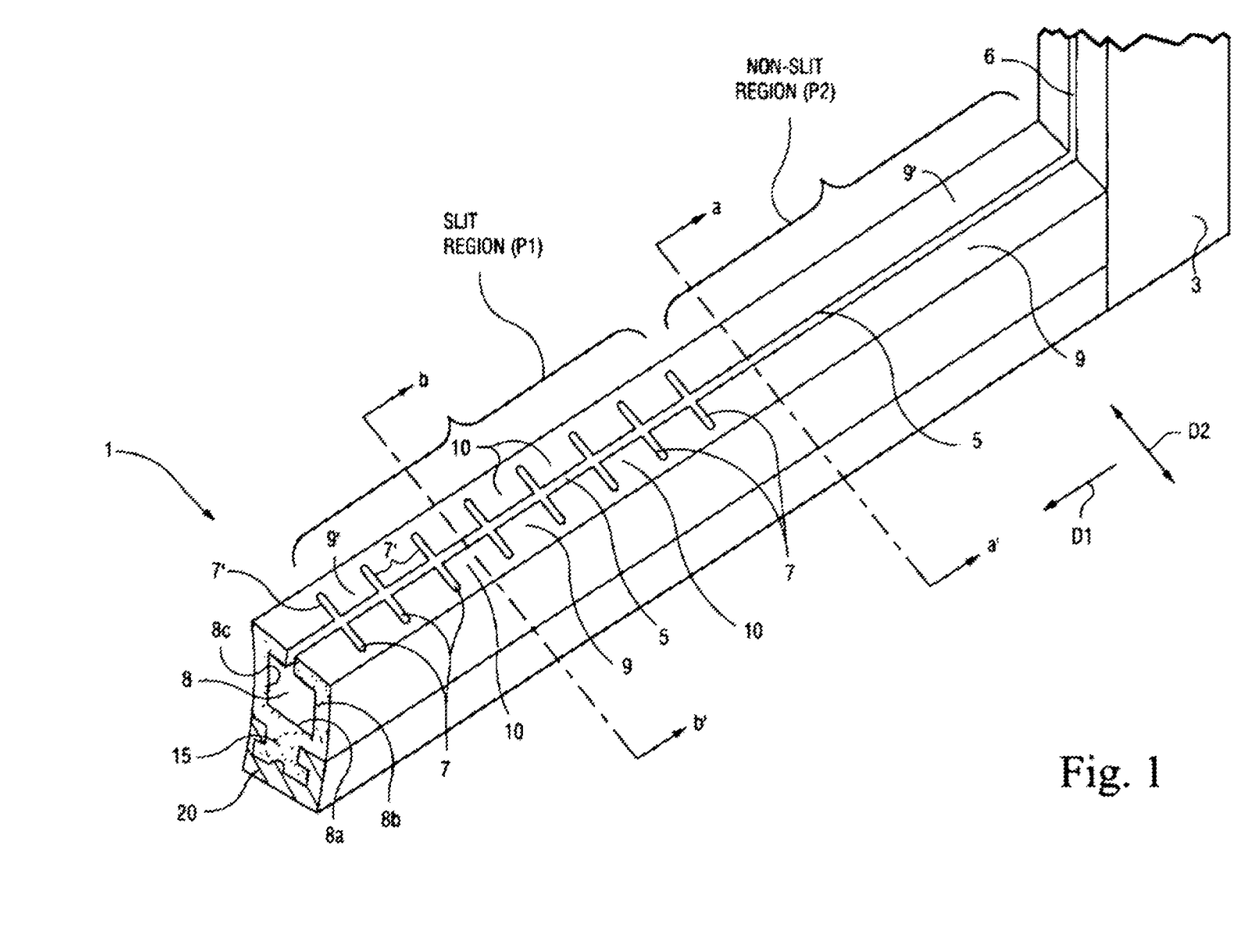
FIG. 1 is a perspective view of an example flexible support provided in the substantially horizontal portion of the rack; a plurality of parallel such flexible supports may be provided in the substantially horizontal portion of the rack in some instances, although only one is illustrated in FIG. 1 for purposes of simplicity and understanding.
Figure 3:
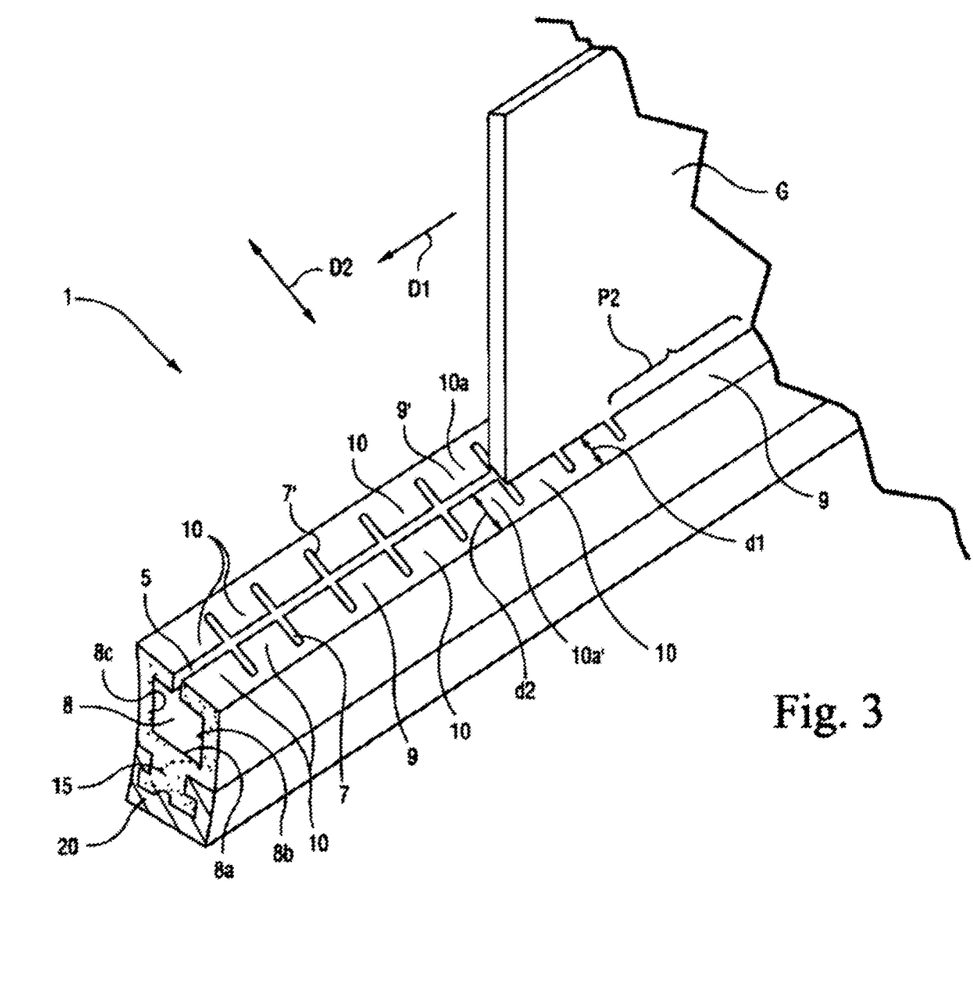
FIG. 3 is a perspective view of the flexible support of FIGS. 1-2, with a glass sheet located in a channel thereof.

FIG. 1 is a perspective view of an example flexible support 1 provided in the substantially horizontal portion 2 of the rack. While a plurality of parallel such flexible supports 1 (e.g., made of extruded rubber, PVC, etc.) may be provided in the substantially horizontal portion 2 of the rack in some instances (e.g., see FIG. 4), only one is illustrated in FIG. 1 for purposes of simplicity and understanding. FIG. 2(*a*) is a cross sectional view of the flexible support 1 along either Section a-a' or b-b' shown in FIG. 1, when no glass sheet is located in the channel 5 of the flexible support (the cross sectional view of both sections are similar); and FIG. 2(*b*) is a cross sectional view of the flexible support 1 along either Section a-a' or b-b' shown in FIG. 1, when a glass sheet G is located in the channel 5 of the flexible support. FIG. 3 is a perspective view of the flexible support 1 of FIGS. 1-2, with a glass sheet G located in channel 5 thereof.

Referring to FIGS. 1-4, in certain example instances, the storage rack R includes a substantially horizontal portion (i.e., horizontal plus/minus about 20 degrees) 2 and a substantially vertical portion (i.e., vertically oriented, plus/minus about 20 degrees) 3. In some instances, the substantially horizontal portion 2 is substantially perpendicular to the substantially vertical portion 3. The glass sheets G are fit into respective supporting channels 5 provided in the substantially horizontal portion 2 and channels 6 provided in the substantially vertical portion 3. A plurality of channels 5 may be provided in the substantially horizontal portion 2, and a plurality of corresponding channels 6 may be provided in the substantially vertical portion 3, so that a plurality of parallel-aligned glass sheets G can be stored in the rack R. For a given glass sheet (e.g., rectangular, octagonal, hexagonal, or the like in shape) G, a bottom edge portion thereof is at least partially located in and supported by a channel 5 defined in the substantially horizontal portion 2, and a side edge portion thereof is at least partially located in and supported by a channel 6 defined in the substantially vertical portion 3 (herein, "edge portion" means at or near the edge of the glass sheet). Typically, the bottom and side edges of the glass sheet G are substantially perpendicular to one another when the glass sheet G is rectangular in shape.

The substantially horizontal portion 2 of the rack R includes one or more horizontally aligned flexible supports 1 made of a flexible material such as rubber, PVC, or the like. Typically, a plurality of such supports 1 are provide in a parallel relationship in making up the horizontal portion 2 of the rack. Each flexible support 1 includes an elongated channel 5 defined therein into which a glass sheet G is to be positioned during storage/transport. As best shown in FIGS. 1-3, each flexible support 1 includes an elongated hollow or cavity 8 defined under and along the length of the channel 5. The hollow or cavity 8 is defined by a bottom wall 8*a*, side walls 8*b* and 8*c*, and top walls 8*d* and 8*d*'. The side walls 8*b* and 8*c* are located between and connect the respective top walls 8*d* and 8*d*' to the bottom wall 8*a*. Side walls 8*b* and 8*c* of the cavity 8 are typically approximately perpendicular (perpendicular plus/minus 10 degrees) to walls 8*a* and 8*d* in certain example non-limiting instances.

Channel 5 is defined between a pair of flexible fingers 9 and 9'. The bottom side of each finger 9 is defined by a top wall (8*d* or 8*d*') of the cavity 8 in certain example instances. Channel 5 is also in communication with the cavity 8 as shown in FIGS. 1-3. A plurality of slits 7, 7' are provided in the fingers 9, 9' along a first portion (P1) of the channel 5, on one or both sides of the channel. While slits 7, 7' are typically provided along both sides of the channel 5 as shown in FIGS. 1-2, it is possible to eliminate the slits (7 or 7') along one side of the channel in certain alternative instances. The slits 7, 7' define a plurality of flexible lips or tabs 10. In particular, each flexible lip or tab 10 is provided between a pair of slits (7 or 7') in a finger 9, 9'. Along a second portion (P2) of the channel and thus in a second portion of the fingers 9, 9', no slits (or no slits of this type) 7, 7' are provided in the flexible support 1. The second portion (P2) having no such slits is typically located between the first portion (P1) having the slits 7, 7' and the substantially vertical portion 3 of the rack as best shown in FIG. 1. In certain instances, adjacent slits 7 and/or 7' in a given finger 9 may be spaced apart from one another by about 0.10 to 0.75 inches, more preferably from about 0.2 to 0.5 inches, and most preferably about 0.25 inches. Moreover, the slits 7, 7' may be of any suitable shape in different instances. For example and without limitation, the slits may be linearly shaped, curved, non-linearly shaped, triangular-shaped, or the like in different examples.

For a given glass sheet G, a bottom edge Gi thereof is fitted into part of the channel 5 defined in the substantially horizontal portion 2. The bottom edge Gi may move through the channel and come to rest on the bottom wall 8*a* of the cavity 8 as shown in FIG. 2(*b*), with a bottom edge portion of the glass sheet G still residing in and being supported by the channel 5. In a similar manner, a side edge portion of the glass sheet G is at least partially located in and supported by a channel 6 defined in the substantially vertical portion 3 of the rack. The bottom edge portion of the glass sheet G is partially located in the first portion (P1) of the channel 5 along which slits (7 and/or 7') (and thus the flexible lips or tabs 10) are located, and partially located in a second portion (P2) of the channel 5 having no such slits (7 and/or 7') provided therealong. In the second portion (P2) of the channel 5, insertion of the glass sheet G thereinto and the thickness of the inserted glass sheet G causes the flexible fingers 9 and 9' along each side of the channel 5 to bend outwardly thereby creating a biasing force of these fingers 9, 9' inwardly against the glass sheet which helps hold the glass sheet in place in the channel (e.g., see FIGS. 2(*b*) and 3).

In the first portion (P1) of the channel 5 along which the slits 7, 7' and flexible lips or tabs 10 are provided, insertion of the glass sheet G thereinto causes at least two things to occur. First, in the area of the first portion (P1) of the channel 5 where the glass sheet G is inserted, the insertion of the sheet G causes the flexible lips or tabs 10 along one or both sides of the channel 5 to bend outwardly, thereby creating a biasing force of these lips or tabs 10 inwardly against the glass sheet G, which helps hold the glass sheet in place in the channel (e.g., see FIGS. 2(*b*) and 3). Second, in the area of the first portion (P1) of the channel where the glass sheet is not inserted (e.g., in the portion of P1 furthest from the substantially vertical portion 3 of the rack R), the flexible lips or tabs 10 are not bent outwardly and thus tend to stay in position in a manner which permits one or more of the non-bent lips or tabs 10 to act as a stop(s) to block movement of the glass sheet Gin a direction D1 away from the substantially vertical portion 3 of the rack. For example, as shown in FIG. 3, non-bent lips or tabs 10*a* and 10*a*' are in an area of P1 where the glass sheet G has not been inserted, and thus tend to stay in position in a manner that permits the non-bent lips or tabs 10*a* and 10*a*' to block movement of the glass sheet Gin a direction D1 away from the substantially vertical portion 3 of the rack This is because if the glass sheet G starts to move in direction D1, the edge of the glass sheet will abut and come to rest against the surfaces of lips/tabs 10a and 10a which are closest to vertical portion 3 of the rack R.

Thus, along the first portion P1 of the channel 5 where the slits 7, 7' are located, some of the flexible lips or tabs 10 are bent by insertion of the glass sheet G and provide a biasing force against the glass sheet G, which helps hold the glass sheet in place against lateral movement in first and second directions D2 (along with channel 6), which are substantially parallel to a plane defined by the substantially vertical portion 3 of the rack; and other(s) of the flexible lips or tabs (e.g., see 10a and 10' in FIG. 3) are not bent and block the glass sheet G against movement in a direction D1 (which is substantially perpendicular to the first and second directions D2) away from the substantially vertical portion 3 of the rack. In other words, the flexible lips or tabs 10 serve to support the glass sheet(s) against movement in multiple directions D1 and D2, which are substantially perpendicular to each other.

The length of the non-slit portion P2 may be about as long as the minimum length of glass sheet G to be positioned in the rack R (e.g., from about 10-24 inches, more preferably about 18 inches). Thus, when the smallest size glass sheet G is located in the channel 5, no lips or tabs 10 are bent by or contacted by the glass sheet G and, thus, the lips or tabs 10 closest to portion P2 can stop the glass sheet G from movement in direction D1. However, when a larger size glass sheet (e.g., 25 inches long glass sheet) is located in the channel, it occupies most or all of portion P2 and some of portion P1 of the channel and thus bends some but not all of flexible lips or tabs 10. In this latter case, as shown in FIG. 3, the non-bent lips or tabs 10a and 10a' closest to the end of the sheet G can stop the glass sheet G from movement in direction D1. Accordingly, it will be appreciated that the rack R is designed so as to accommodate multiple sizes of glass sheet, without the need for adjustment when different sized glass sheets are inserted into or stored in the rack. However, in alternative instances, it is possible to provide slits 7 and/or 7' along the entire length of the channel 5 thereby eliminating non-slit portion P2.

As perhaps best shown in FIGS. 1 and 3, flexible supports 1 may be supported by a track or support 20 in certain example instances. In certain example instances, the track or support includes a cavity into which a key-like projection 15 of the support 1 fits in a sliding manner. In other words, the support 1 can be slidingly fitted to the track 20 in a key/keyway manner in certain example instances. This permits supports 1 to be easily replaced, removed, inserted, and/or repaired in an efficient manner. In certain example instances, the track or support 20 may be of any suitable material, such as aluminum or the like.

FIG. 4 illustrates that a retainer 25 may be provide at or near an end of the horizontal portion 2 of the rack furthest from the vertical portion 3 of the rack. Retainer 25 may be located over end portions of the array of flexible supports 1 as shown in FIG. 4, and the attachment of retainer 25 to the rack may help maintain the supports 1 in position on the rack. When it is desired to replace one or more supports 1, retainer 25 may be removed by a screw or the like.

The entire contents of U.S. Pat. No. 7,648,035 is hereby incorporated herein by reference.

Figure 5:
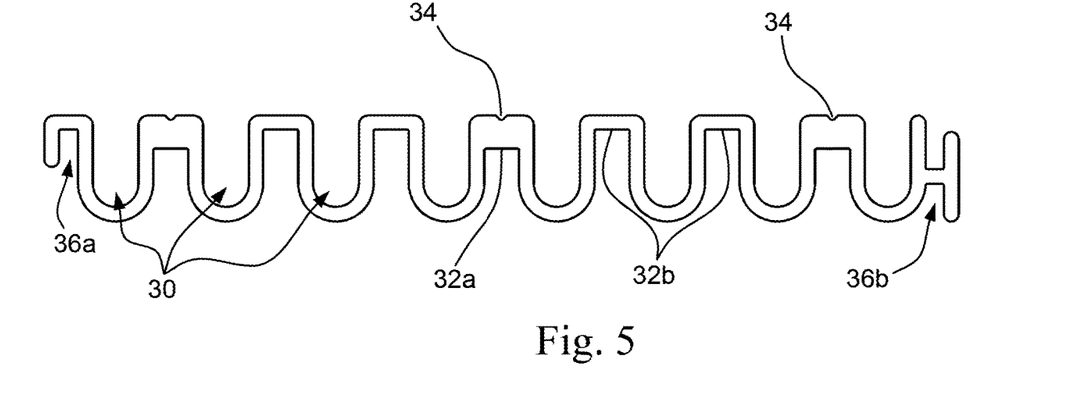
FIG. 5 is a cross-sectional view of an alternate rail design that may be used in certain example instances.

FIG. 5 is a cross-sectional view of an alternate rail design that may be used in certain example instances. This example rail design may be used on the horizontal and/or vertical portions of a rack in different example instances. Dimensions are provided on FIG. 5 for purposes of example and without limitation. Similar to the above, the rail design of FIG. 5 includes a plurality of channels 30. These channels are substantially U-shaped when viewed in cross section. Bridging portions 32a, 32b separate adjacent channels 30. The first type of bridging portion 32a has a height dimension that is greater than the second type of bridging portion 32b. The types of bridging portions may alternate or, as shown in FIG. 5, multiple of one type of bridging portion (e.g., second type 32b) may be interposed between successive ones of the other type of bridging portion (e.g., second type 32a). This arrangement may in some instances provide for greater flexibility when glass sheets G or the like are inserted in the channels 30, while still providing for a resilient overall rail design. In some instances, slits 34 may be provided to one or both of the bridging portion types. In the FIG. 5 example, only bridging portions 32a include slits 34. These slits may function substantially as described above. Rigid walls 36a, 36b may be provided at opposing ends of the FIG. 5 example rail. The rigid walls 36a, 36b are shown to have different profiles in FIG. 5, but they may be the same in different example instances. The FIG. 5 arrangement may be advantageous in enabling a rail assembly to be formed from multiple FIG. 5 rails, e.g., by hooking a left end portion 36a of one rail to an adjacent right end portion 36b of another rail. Multiple rails may be connected together in this manner, forming an assembly, and enabling smaller parts to be manufactured and connected together to form differently sided racks.

Figure 6:
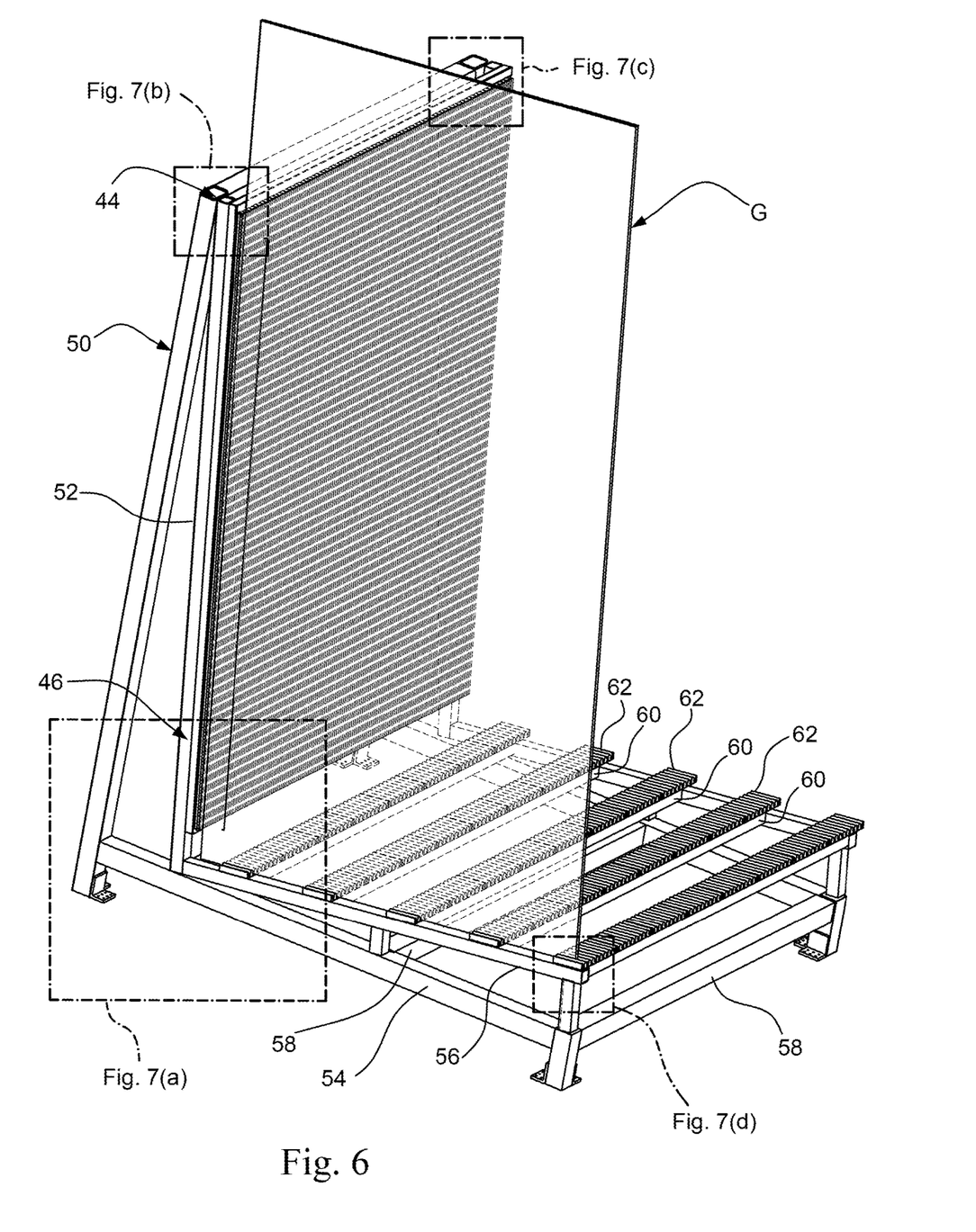
FIG. 6 is a front perspective view of a rendered, alternative glass rack.
Figure 7A:
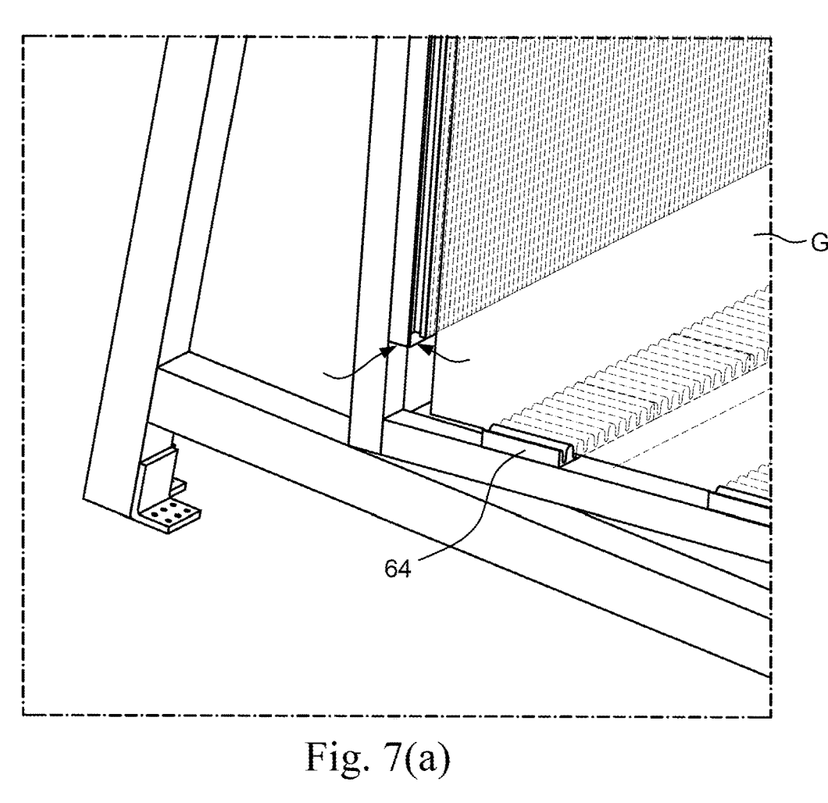
Figure 7B:
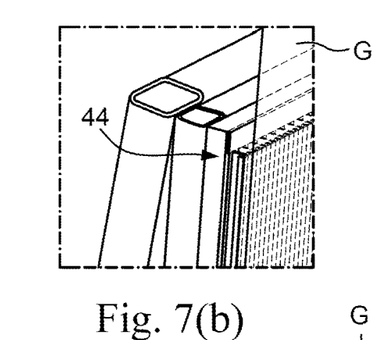
Figure 7C:
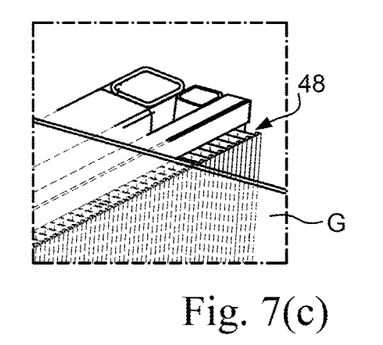
Figure 7D:
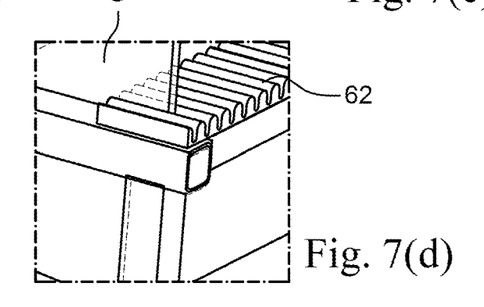

FIG. 6 is a front perspective view of a rendered, alternative glass rack. FIGS. 7(a)-7(d) show enlarged portions of the FIG. 6 example glass rack. More particularly, FIG. 7(a) is an enlarged perspective view of a rear left portion at the bottom of the FIG. 6 example glass rack, FIG. 7(b) is an enlarged perspective view of a top left portion thereof, FIG. 7(c) is an enlarged perspective view of a top right portion thereof, and FIG. 7(d) is an enlarged perspective view of a front left portion at the bottom of the FIG. 6 example glass rack. A single glass sheet G is shown in FIGS. 6-7(d) for simplicity and understanding, although it will be appreciated that more glass sheets may be inserted into the channels thereof, in use. This example rack is similar to that which is described above. Its vertical portion includes end pieces 44 (which may be aluminum extrusions in certain example instances) connected to a backer 46 (e.g., of plywood or the like). The end pieces 44 help hold in place the upper gasket assembly 48. As above, the gasket assembly 48 may be formed from rubber, PVC, or other suitable material. The main vertical uprights 50, 52 may be formed from a strong, resilient material such as, for example, steel, iron. It will be appreciated that one or more backers 46 may be provided. Similarly, it will be appreciated that one or more end pieces 44 may be provided (e.g., multiple pieces may be provided for the top and bottom and left and right areas, a single piece may be provided, etc.).

The horizontal portion of the FIG. 6 example includes main horizontal beams 54, 56 and lower and upper cross-members 58, 60, which may be formed from the same or different material as the main vertical uprights 50, 52. In certain example instance, a base may extend along the bottom of the rack over the upper main horizontal beam 56 and the upper cross members 60, similar to how the backer 46 is provided the main vertical uprights 50, 52. One or more rails may be continuous, front-to-back, along this lower base in some instances, so as to accommodate glass articles inserted therein (such as the glass sheet G shown in FIG. 7(a), for example). In this example, however, plural rails 62 are provided along the upper cross-members 60. End blocks 64, or end portions of the rails 62, help hold the rails 62 in place.

Figure 8:
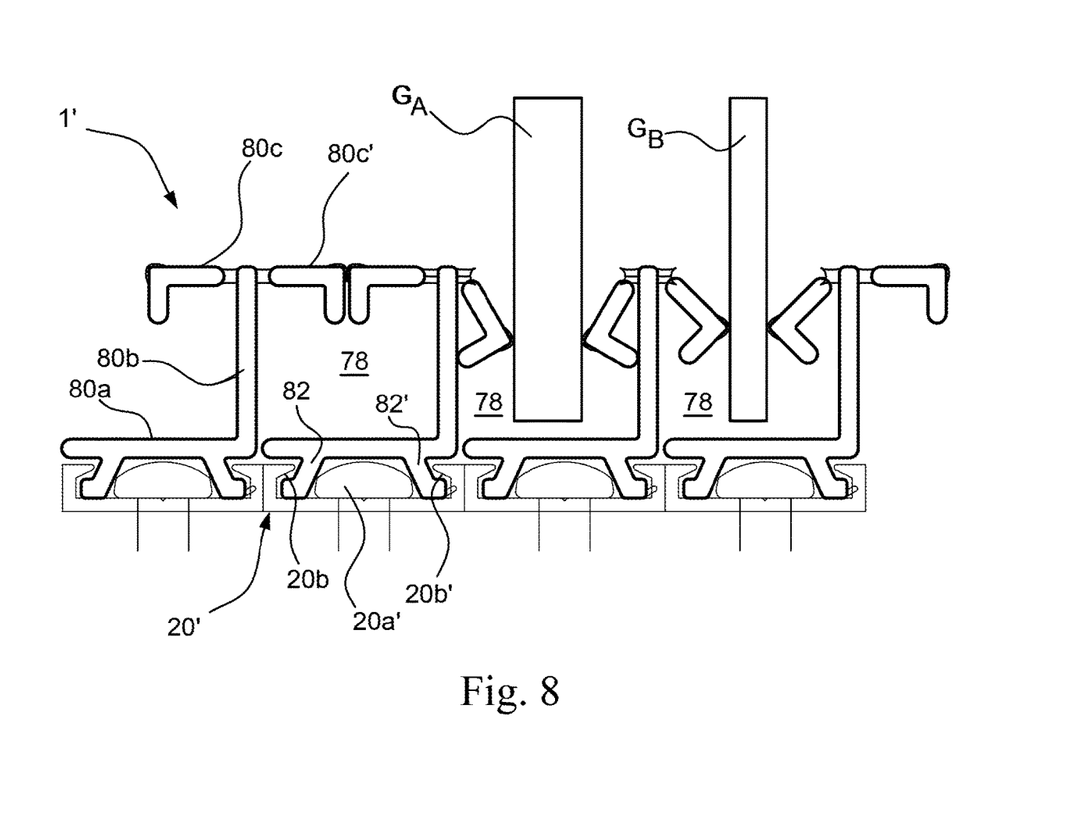
FIG. 8 is a cross-sectional view of an example gasket assembly that may be used in certain example instances.

As can be appreciated from FIG. 7(d), for example, the FIG. 5 example rails are used for the horizontal portion for the FIG. 6 example rack. However, as can be appreciated from FIG. 7(c), a different design is used for the vertical portion. In this regard, FIG. 8 is a cross-sectional view of an example gasket assembly that may be used in certain example instances. This FIG. 8 example design is used in the FIG. 6 example rack in connection with the vertical uprights 50, 52.

The FIG. 8 example design is similar to shown in, and discussed above in connection with, FIGS. 1-4, except that adjacent flexible lips or tabs provided with respect to individual channels in FIG. 8 are provided with little to no space therebetween, and a different track or support 20' engages differently with the flexible supports 1' (but still in a keyway manner). As shown in FIG. 8, the flexible supports 1' each include a base wall 80a together with a single side wall 80b from which the flexible lips 80c, 80c' extend. The base wall 80a has legs 82, 82' that facilitate the connection between the flexible support 1' and the track or support 20'. These legs 82, 82' define a recess or channel for accommodating a protrusion 20a' in a center portion of the track or support 20', and for hooking onto opposing barbs 20b, 20b' at left and right edges of the track or support 20'.

The flexible supports 1' in the FIG. 8 example may be formed from any suitable material such as, for example, rubber, PVC, or the like. In one example, the flexible supports 1' are formed from a dual-extrusion PVC. In this example, hinged material may be provided to facilitate the movement of the flexible lips 80c, 80c', and a harder and/or thicker material may be provided for the other parts of the T-shaped flexible supports 1'. In certain example instances, multiple flexible supports 1' may be integral with one another and/or multiple track or support 20' portions may be integral with one another. In other example instances, discrete pieces may connection with one another.

The FIG. 8 example shows recesses 78 accommodating differently sided articles GA and GB, by way of example and without limitation. Thicker article GA may be, for example, a laminated product, whereas thinner article GB may be a monolithic sheet or the like. Dimensions are provided in FIG. 8 by way of example and without limitation.

Figure 9:
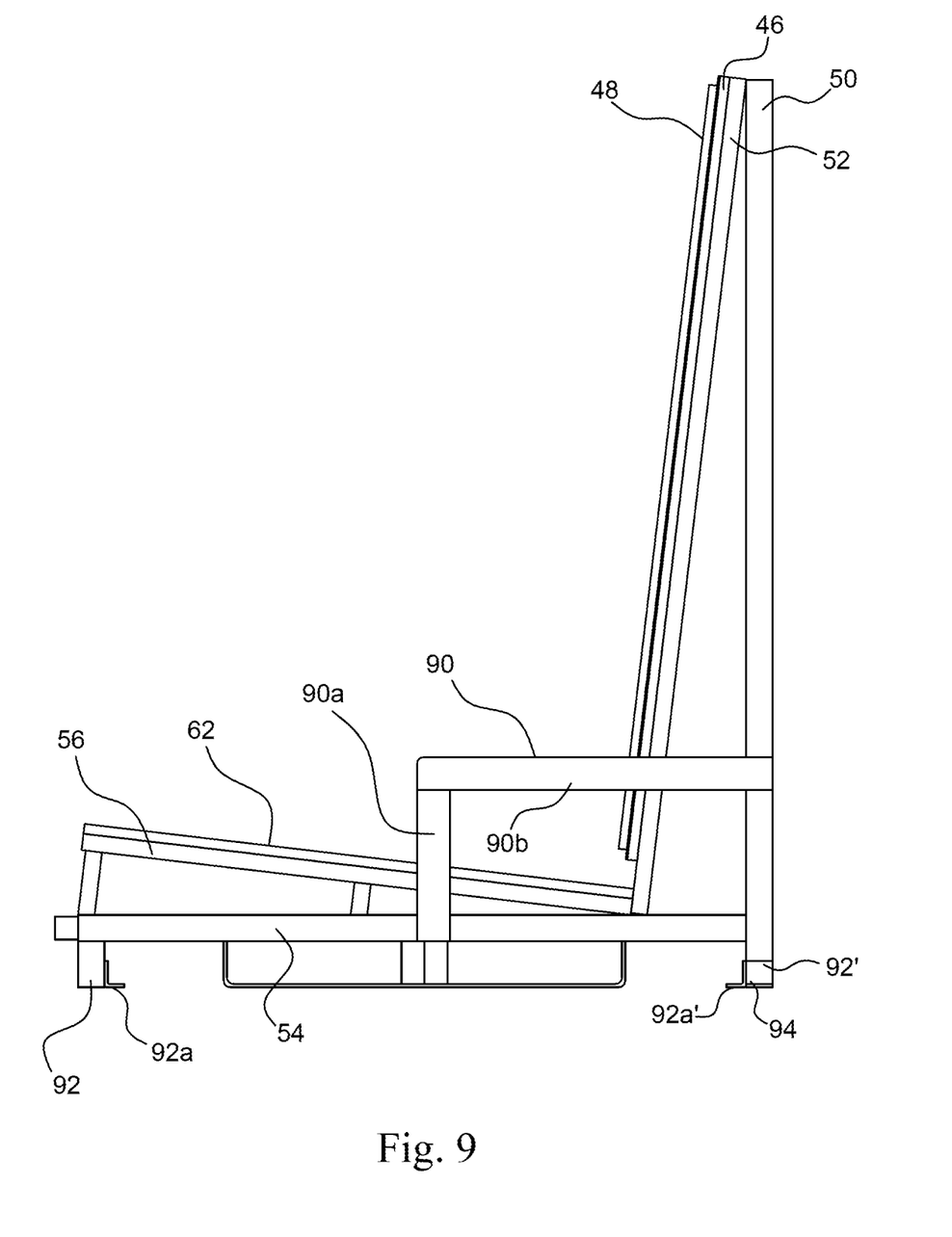
FIG. 9 is a schematic, right side view of a glass rack in accordance with certain example embodiments.

FIG. 9 is a schematic, right side view of a glass rack in accordance with certain example embodiments. At this schematic level, the left side view of the FIG. 9 example is a mirror image of the right side view. The rack shown in the FIG. 9 example is similar to those discussed above. For example, it includes a vertical portion with vertical uprights 50, 52. The inner upright 52 supports the backer 46, and a gasket assembly 48 is disposed on the backer 46. The horizontal component includes main horizontal beams 54, 56 and cross-beams as discussed above. The upper horizontal beam 56 supports rails 62. It will be appreciated that other gasket assembly/rail configurations may be used in different example embodiments. For instance, in certain example embodiments, supports rail configurations may be used for both horizontal and vertical components, gasket assembly configurations may be used for both horizontal and vertical components, etc.

The FIG. 9 example rack also includes arms 90 at its left and right sides. The arm 90 includes a substantially vertical member 90a and a substantially horizontal member 90b. The substantially vertical member 90a and the substantially horizontal member 90b may be formed from the same material as the vertical uprights 50, 52 and horizontal beams 54, 56 (e.g., a mild steel, iron, or the like) and may be substantially perpendicular to one another. The arms may be welded to the vertical uprights 50, 52 and horizontal beams 54, 56 at all contact locations along the exterior thereof. The substantially vertical member 90a of the arm 90 thus is substantially parallel to the outer upright 50 and substantially perpendicular to the lower horizontal beam 54. Likewise, the substantially horizontal member 90b thus is substantially parallel to the lower horizontal beam 54 and substantially perpendicular to the outer upright 50. The front corner of the bar (e.g., where the substantially vertical member 90a and substantially horizontal member 90b meet) may be ground or otherwise rounded or protected for safety purposes, e.g., as the material from which the arms are made may be sharp and may cut someone or damage something coming into contact therewith.

The FIG. 9 example rack includes front and rear legs 92, 92'. The front legs 92 include rear-facing tabs 92a that are welded thereto. The rear legs include front-facing tabs 92a' and outward-facing tabs 94. The direction a tab faces here refers to the direction, relative to the rack, in which the lower lip extends. The front and/or rear legs 92, 92' may have recesses formed therein, e.g., so that there is a hole therein when viewed from the underside of the FIG. 9 example rack. FIG. 9 includes dimensions provided by way of example and without limitation.

Figure 10:
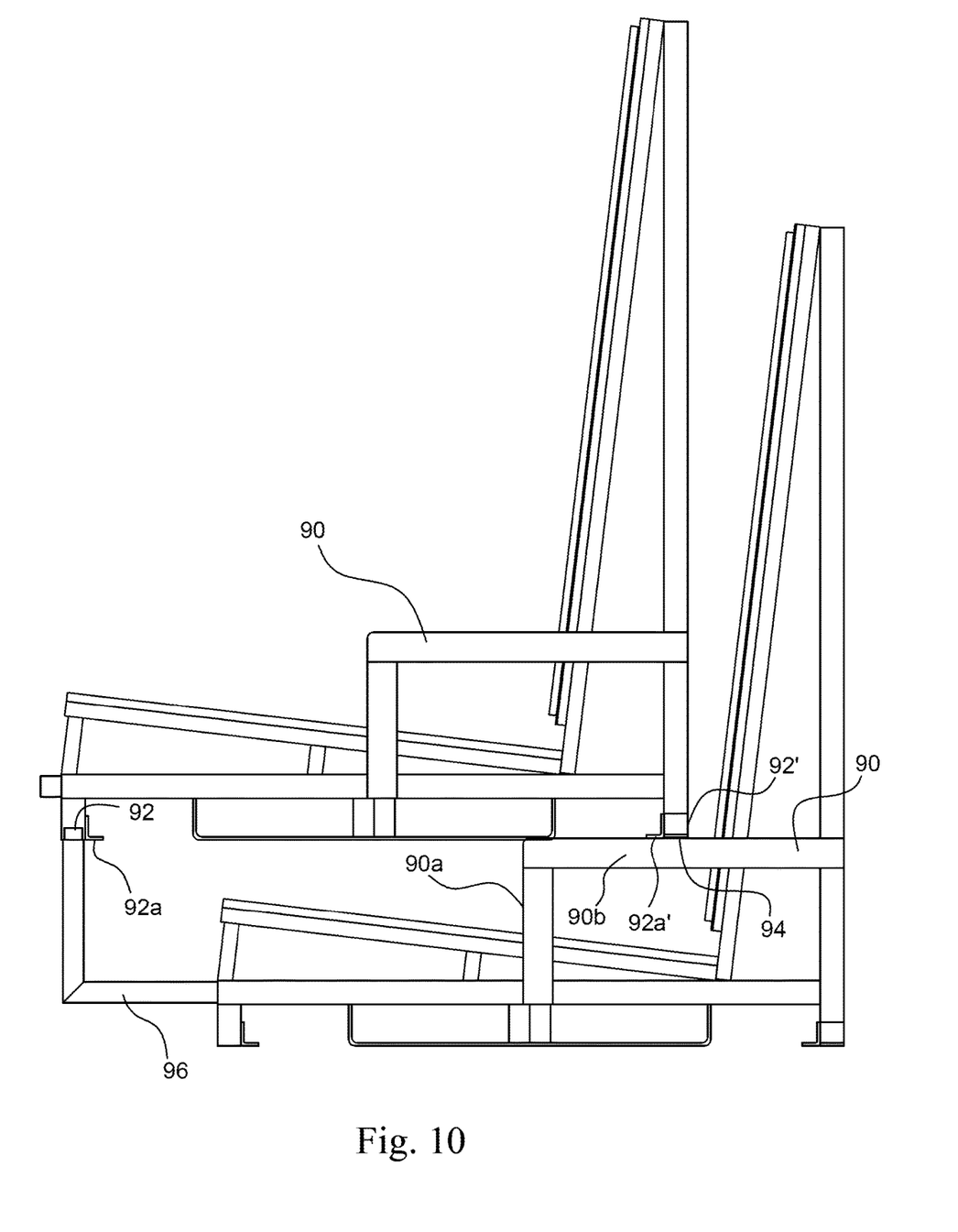
FIG. 10 schematically shows two fo the FIG. 9 example racks stacked one on top of the other.

The arms 90 advantageously enable the FIG. 9 example rack to become stackable. FIG. 10, for example, shows two stacked racks, one on top of the other. Providing welded arms 90 eliminates the need for arms that can be moved into and removed from receiver pockets. The use of movable arms made it difficult to stack models, as the arms could be lost, damaged, and/or slide once inserted. This arrangement makes it much easier to stack glass racks for transportation, storage, and/or the like. The use of movable arms also was found to be disadvantageous because the upper racks would move relative to the racks that they were sitting on, causing the back of the upper rack to dig into the front edge of the lower rack on which it was sitting. This was found to damage the gaskets, sometimes tearing them apart. It because difficult, time-consuming, and wasteful to have to continue replacing gasket materials in such circumstances.

Receiver pockets are formed at the front of the rack, e.g., via tubing or the like provided to the lower beam 54. These receiver pockets accommodate support members 96. The front of the upper rack can sit on these support members 96. For instance, the front legs 92 may have recesses/holes therein as described above, which may accommodate the upwardly-extending portion of the support members 96.

The length of the arms is sufficiently long/provides a center of balance sufficient to ensure proper stacking and reduce the likelihood of the upper racks tipping. The stability of the rack is further facilitated in certain example instances by having the support members 96 fit into the recesses/holes of the front legs 92. In addition, outward-facing tabs 94 provide additional surface area that can side on the rear portions of the arms 90. This allows some side-to-side movement of the upper rack relative to the lower rack, again reducing the likelihood of tipping.

No upper arms are shown in the FIG. 9 example, as they need to be provided in some instances, given that the lower arms are sized, shaped, and arranged to hold the racks in place relative to one another, and given that the tabs 94 on the rear legs 92' further help in this regard.

Figure 11:
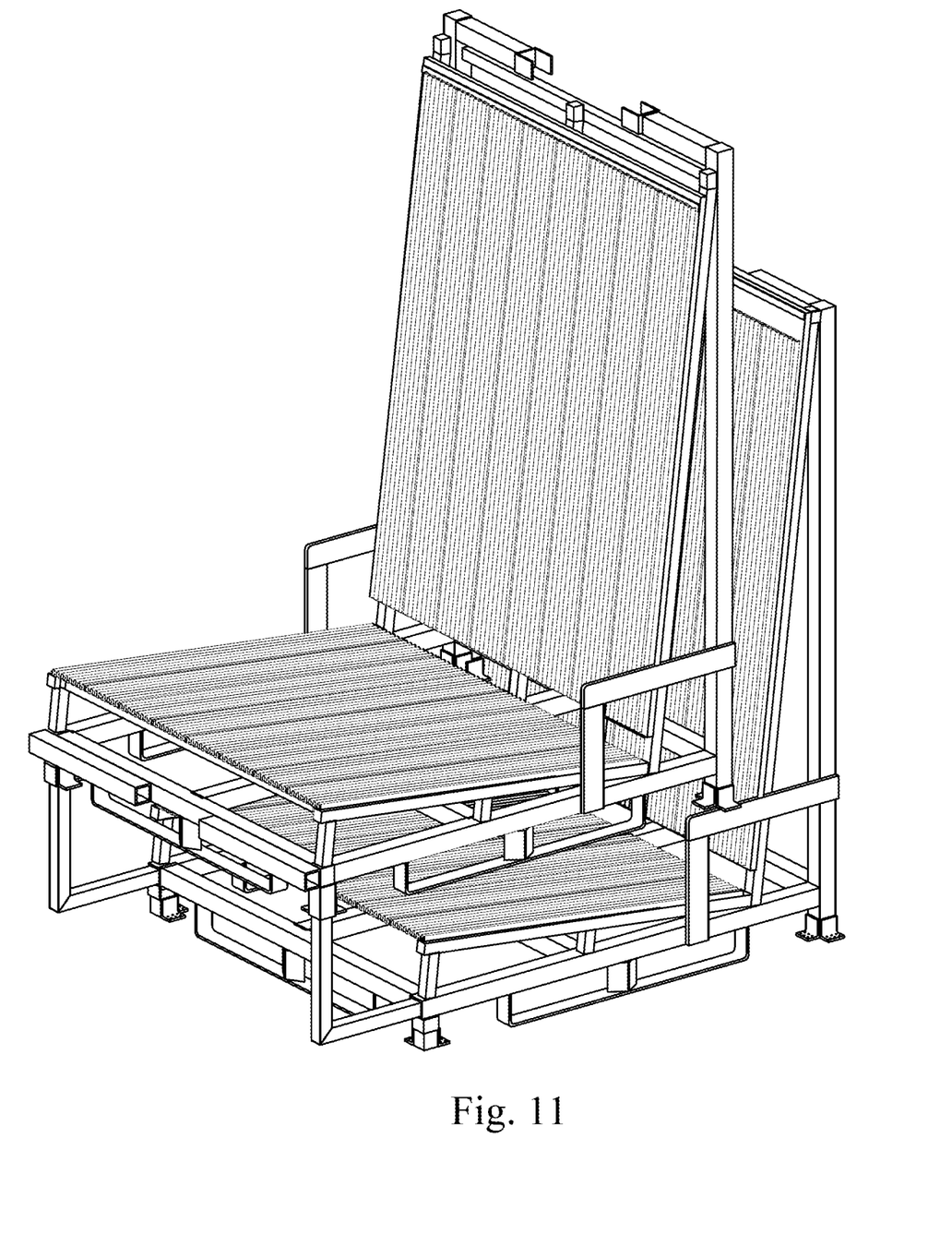
FIG. 11 is a perspective view of two racks of the type shown schematically in, and described in connection with, FIGS. 9-10 provided in a stacked configuration.
Figure 12:
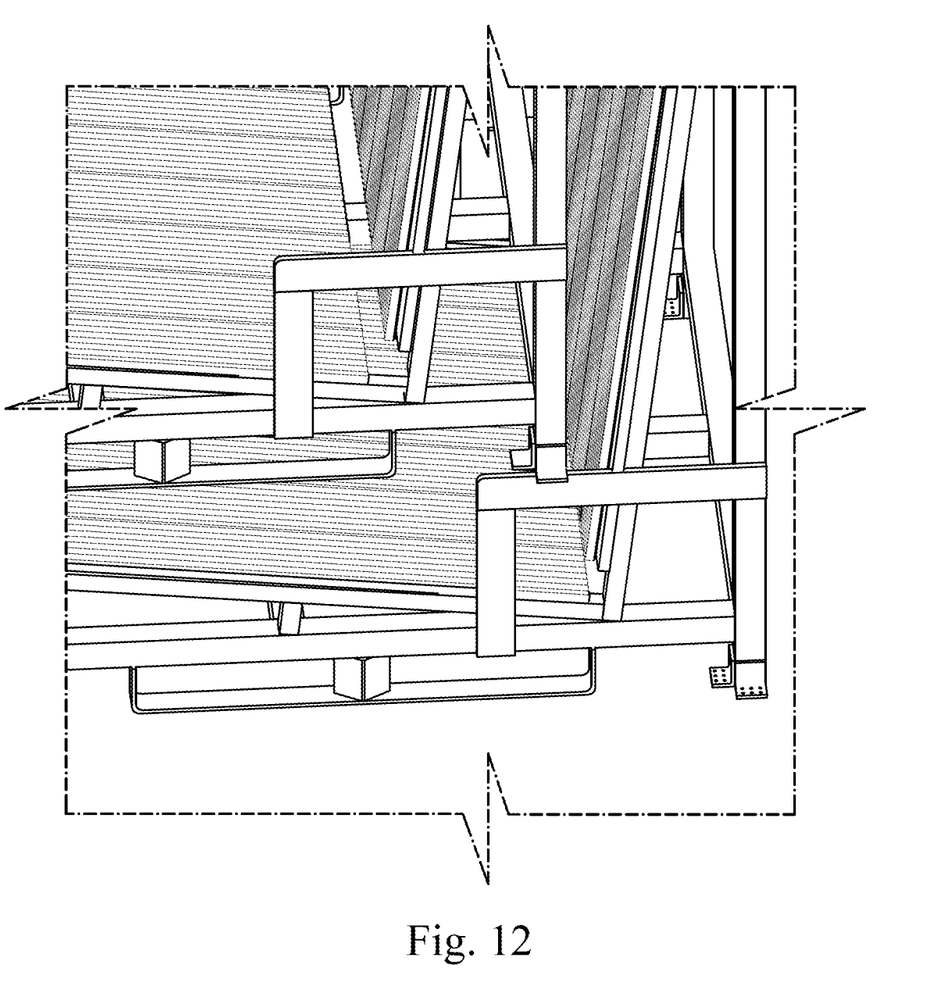
FIG. 12 is a close-up of the rear portion of FIG. 11.

FIG. 11 is a perspective view of two racks of the type shown schematically in, and described in connection with, FIGS. 9-10 provided in a stacked configuration, and FIG. 12 is a close-up of the rear portion thereof, showing the rear tabs 94 resting on the arms 90. The tubes for accommodating the support members 96 can be seen in FIG. 11, and a sense of the holes in the front legs 92 can be gained from FIG. 11 as well.

Although two racks are shown in FIGS. 10-12, it will be appreciated that more racks may be stacked in some instances. However, stacking two racks works particularly well, given the height of conventional transit vehicles such as, for example, trucks, rail cars, etc. It has been found that stacking racks of this type in the manner described is advantageous in that they do not bounce off one another in transit. This has been attributed to the weight of the individual racks together with the rearward-focused center of gravity in the stacked arrangement. It also has been found that these racks may easily accommodate oversized glass articles.

The racks may be stacked back-to-back in some instances, e.g., to simulate an A-frame design, e.g., even though two substantially L-shaped designs are used. This may be beneficial in a variety of arrangements. See, for example, the transport-related disclosures and other design options in U.S. Publication No. 2018/0186561, the entire contents of which are hereby incorporated by reference herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rack for holding a plurality of glass sheets, the rack comprising:
    a substantially horizontal portion having a front end, a rear end, and a first length;
    a substantially vertical portion having a bottom end and a top end, wherein the substantially vertical portion is oriented substantially perpendicular to the substantially horizontal portion;
    left and right arms that connect the substantially vertical portion and the substantially horizontal portion, each of the left and right arms including a substantially horizontal member and a substantially vertical member, wherein the substantially vertical member is oriented substantially perpendicular to the substantially horizontal member, wherein each arm has a second length that is smaller than the first length of the substantially horizontal portion;
    a plurality of front legs at the front end of the substantially horizontal portion, and a plurality of rear legs at the rear end of the substantially horizontal portion; and
    a gasket assembly provided on at least one of the substantially horizontal portion and the substantially vertical portion, the gasket assembly comprising a plurality of elongated channels therein,
    wherein the elongated channels are defined along a length of the gasket assembly, and each channel of the gasket assembly is configured to receive an edge portion of a respective glass sheet therein so that each respective glass sheet extends along a substantial portion of the length of the gasket assembly;
    at least one substantially L-shaped support member attached to the substantially horizontal portion;
    wherein the rack is a first rack, wherein the first rack is configured to receive a second rack that is substantially identical to the first rack in a stacked manner with rear legs of the second rack resting directly on the arms of the first rack and at least one front leg of the second rack resting directly on the at least one support member.

2. The rack of claim 1, wherein the gasket assembly further comprises:
    first and second flexible fingers provided on opposite sides of each channel,
    a plurality of slits defined in the first and second flexible fingers adjacent each said channel so that the slits have respective open end portions at each channel respectively, and
    the first and second flexible fingers define a plurality of flexible lips between respective pairs of the slits;
    wherein the slits extend outwardly from each channel in a width direction of the gasket assembly.

3. The rack of claim 2, wherein, when in use, a respective glass sheet is configured to be inserted into one of the channels with a first corresponding number of the flexible lips along said one of the channels being bent by the insertion of the respective glass sheet and a second corresponding number of the flexible lips along said one of the channels not being bent by the insertion of the respective glass sheet, and wherein one or more of the second corresponding number of flexible lips is configured to block the respective glass sheet from sliding in said one of the channels in a direction away from the substantially vertical portion of the first rack.

4. The rack of claim 1, wherein, when in use, the at least one front leg of the second rack comprises a hole or recess that is adapted to receive the at least one support member of the first rack.

5. The rack of claim 1, wherein the substantially horizontal portion and the substantially vertical portion each comprises a corresponding gasket assembly.

6. The rack of claim 1, wherein the substantially vertical portion includes the gasket assembly and the substantially horizontal portion does not.

7. The rack of claim 6, wherein the substantially horizontal portion includes a plurality of rails, wherein the rails are aligned with the channels of the gasket assembly to accommodate the glass sheets.

8. The rack of claim 7, wherein the rails are substantially U-shaped when viewed in cross-section.

9. The rack claim 1, wherein the gasket assembly is mounted to a track.

10. A method of utilizing racks, comprising the steps of:
    providing a first rack;
    providing a second rack that is substantial identical to the first rack;
    wherein the first rack and the second rack each comprise:
        a substantially horizontal portion having a front end, a rear end, and a first length;
        a substantially vertical portion having a bottom end and a top end, wherein the substantially vertical portion is oriented substantially perpendicular to the substantially horizontal portion;
        left and right arms that connect the substantially vertical portion and the substantially horizontal portion, each of the left and right arms including a substantially horizontal member and a substantially vertical member, wherein the substantially vertical member is oriented substantially perpendicular to the substantially horizontal member, wherein each arm has a second length that is smaller than the first length of the substantially horizontal portion;

a plurality of front legs at the front end of the substantially horizontal portion, and a plurality of rear legs at the rear end of the substantially horizontal portion; and a gasket assembly provided on at least one of the substantially horizontal portion and the substantially vertical portion, the gasket assembly comprising a plurality of elongated channels therein, wherein the elongated channels are defined along a length of the gasket assembly, and each channel of the gasket assembly is configured to receive an edge portion of a respective glass sheet therein so that each respective glass sheet extends along a substantial portion of the length of the gasket assembly;

attaching at least one substantially L-shaped support member to the substantially horizontal portion of the first rack; and stacking the second rack on the first rack with the rear legs of the second rack resting directly upon the arms of the first rack and at least one of the front legs of the second rack resting directly upon the at least one support member of the first rack.

11. The method of claim 10, further comprising the steps of:

providing a hole in said at least one of the front legs of the second rack; and inserting the at least one support member of the first rack into the hole of said at least one of the front legs of the second rack.

12. A rack system for holding a plurality of glass sheets, the rack system comprising:

a first rack;

a second rack that is substantially identical to the first rack;

wherein the first rack and the second rack each comprise:
  a substantially horizontal portion having a front end, a rear end, and a first length;
  a substantially vertical portion having a bottom end and a top end, wherein the substantially vertical portion is oriented substantially perpendicular to the substantially horizontal portion;
  left and right arms that connect the substantially vertical portion and the substantially horizontal portion, each of the left and right arms including a substantially horizontal member and a substantially vertical member, wherein the substantially vertical member is oriented substantially perpendicular to the substantially horizontal member, wherein each arm has a second length that is smaller than the first length of the substantially horizontal portion;
  a plurality of front legs at the front end of the substantially horizontal portion, and a plurality of rear legs at the rear end of the substantially horizontal portion; and
  a gasket assembly provided on at least one of the substantially horizontal portion and the substantially vertical portion, the gasket assembly comprising a plurality of elongated channels therein, wherein the elongated channels are defined along a length of the gasket assembly, and each channel of the gasket assembly is configured to receive an edge portion of a respective glass sheet therein so that each respective glass sheet extends along a substantial portion of the length of the gasket assembly;

wherein the first rack comprises at least one substantially L-shaped support member attached to the substantially horizontal portion of the first rack;

wherein the second rack is configured to be stacked on top of the first rack with the rear legs of the second rack resting directly on the arms of the first rack and at least one of the front legs of the second rack resting directly on the at least one support member of the first rack.

* * * * *